United States Patent
Markson et al.

(10) Patent No.: US 6,714,980 B1
(45) Date of Patent: Mar. 30, 2004

(54) BACKUP AND RESTORE OF DATA ASSOCIATED WITH A HOST IN A DYNAMICALLY CHANGING VIRTUAL SERVER FARM WITHOUT INVOLVEMENT OF A SERVER THAT USES AN ASSOCIATED STORAGE DEVICE

(75) Inventors: Thomas Markson, Palo Alto, CA (US); Ashar Aziz, Fremont, CA (US)

(73) Assignee: Terraspring, Inc., Fremont, CA (US)

( * ) Notice: Subject to any disclaimer, the term of this patent is extended or adjusted under 35 U.S.C. 154(b) by 118 days.

(21) Appl. No.: 10/104,886

(22) Filed: Mar. 22, 2002

Related U.S. Application Data

(63) Continuation-in-part of application No. 09/502,170, filed on Feb. 11, 2000.

(51) Int. Cl.[7] ............................................. G06F 15/173
(52) U.S. Cl. ..................... 709/226; 709/104; 709/105; 709/223; 709/225; 709/208; 707/204; 707/205
(58) Field of Search ................................. 709/223, 225, 709/226, 104, 105, 208; 707/204, 205

(56) References Cited

U.S. PATENT DOCUMENTS

| | | |
|---|---|---|
| 4,591,967 A | 5/1986 | Mattes et al. |
| 5,163,130 A | 11/1992 | Hullot |
| 5,504,670 A | 4/1996 | Barth et al. |
| 5,574,914 A | 11/1996 | Hancock et al. |
| 5,590,284 A | 12/1996 | Crosetto |
| 5,659,786 A | 8/1997 | George et al. |
| 5,751,967 A | 5/1998 | Raab et al. |
| 5,819,042 A | 10/1998 | Hansen |
| 5,821,937 A | 10/1998 | Tonelli et al. |
| 5,951,683 A | 9/1999 | Yuuki et al. |
| 5,974,563 A * | 10/1999 | Beeler, Jr. ..................... 714/5 |
| 6,182,139 B1 | 1/2001 | Brendel |
| 6,230,200 B1 * | 5/2001 | Forecast et al. ............ 709/226 |

(List continued on next page.)

FOREIGN PATENT DOCUMENTS

| | | |
|---|---|---|
| EP | 0 262 750 A2 | 4/1988 |
| EP | 0 490 624 A2 | 6/1992 |
| EP | 0 750 256 A2 | 12/1996 |
| EP | 0 791 881 A1 | 8/1997 |
| EP | 0 905 621 A1 | 3/1999 |
| EP | 0917056 A2 | 5/1999 |
| EP | 0935200 A1 | 8/1999 |
| WO | WO 97/49214 A1 | 12/1997 |
| WO | WO 99/57957 A2 | 11/1999 |
| WO | WO 00/29954 A1 | 5/2000 |

OTHER PUBLICATIONS

Rob Short, et al., "Windows NT Clusters for Availability and Scalability," 1997 IEEE, pp. 8–13.

Eric Prud'hommeaux, "XML–based HTTP Server Configuration Language," http://www.w3.org/1999/07/9–http–server–conf.html, Sep. 7, 1999, XP–002152599, pp. 1–5.

(List continued on next page.)

*Primary Examiner*—Nabil El-Hady
(74) *Attorney, Agent, or Firm*—Christopher J. Palermo; Hickman Palermo Truong & Becker LLP

(57) ABSTRACT

One or more datasets of a computer data storage device that participates in a dynamically changing virtual server farm are backed up without involving or affecting operation of servers in the virtual server farm that use the data storage device, and without receiving information about the structure or content of data in the datasets, the topology of the virtual server farm, or the type of server, file system, or operating system in use by the servers. A restore operation provides restored data on an address that is linearly related to and separated from a backup address. Data can be restored to a storage device without interfering with operation of the servers that use the data and without regard to structure or content of the data.

29 Claims, 9 Drawing Sheets

U.S. PATENT DOCUMENTS

| | | |
|---|---|---|
| 6,381,321 B1 | 4/2002 | Brown et al. |
| 6,389,432 B1 * | 5/2002 | Pothapragada et al. ..... 707/205 |
| 6,446,141 B1 | 9/2002 | Nolan et al. |
| 6,466,559 B1 | 10/2002 | Johansson et al. |
| 6,505,229 B1 | 1/2003 | Turner et al. |
| 6,597,956 B1 * | 7/2003 | Aziz et al. ..................... 700/3 |

OTHER PUBLICATIONS

Nathan J. Muller, "Design and Conquer," Oct. 1996, *BYTE*, vol. 21, No. 10, XP 000683573, pp. 93–98.

Elliotte Rusty Harold, "XML: Extensible Markup Language," 1998, pp. 1–431.

Radek Vingralek, et al., "Snowball: Scalable Storage on Networks of Workstations with Balanced Load," pp. 117–156, Distributed and Parallel Databases, vol. 6, No. 2, Apr. 1998, XP–002162201.

Armando Fox, et al., "Cluster–Based Scalable Network Services," pp. 78–91, Operating Systems Review (SIGOPS), US, ACM Headquarter, New York, vol. 31, No. 5, Dec. 1, 1997, XP–000771023.

* cited by examiner

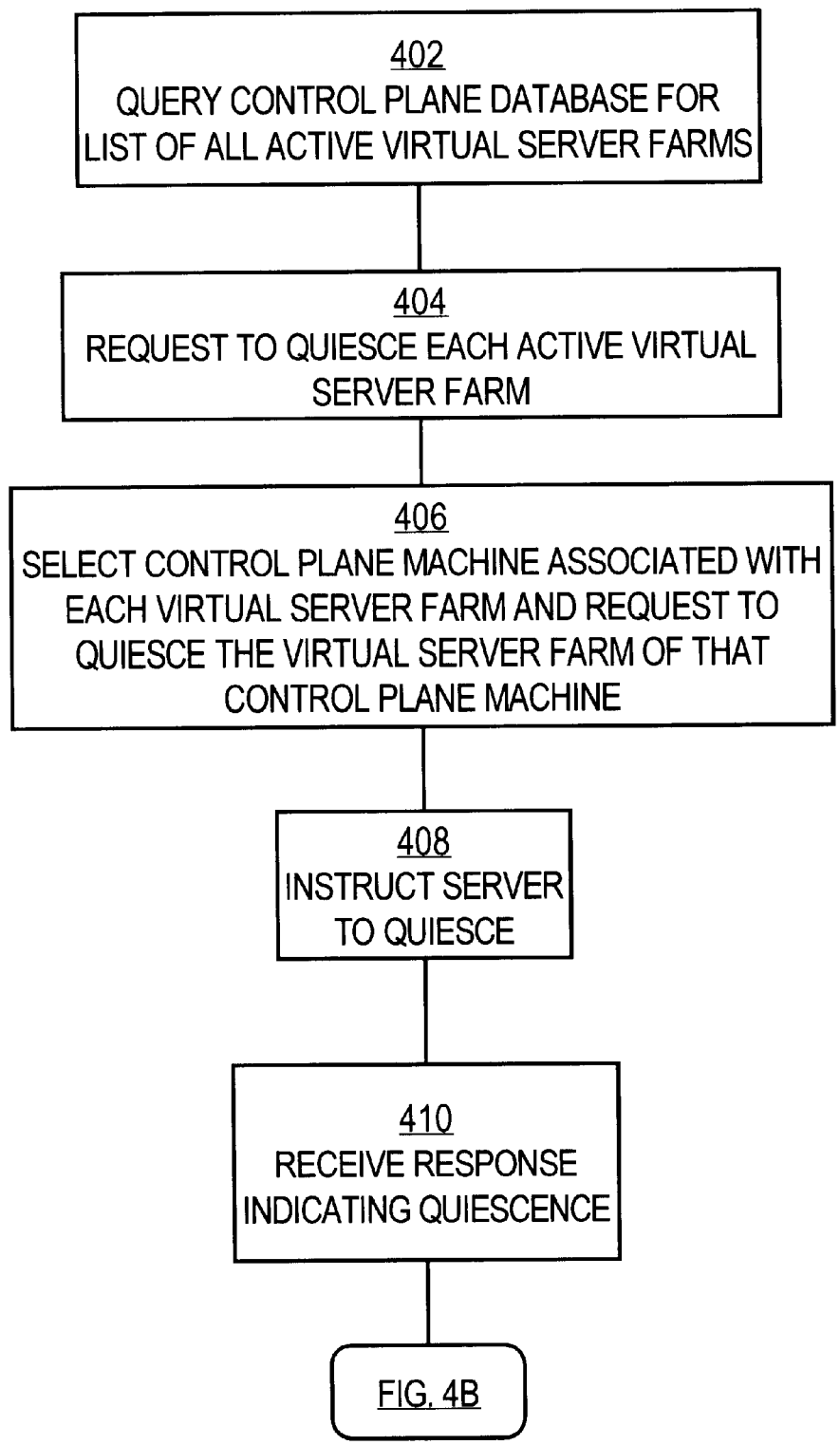

BACKUP AND RESTORE OF DATA ASSOCIATED WITH A HOST IN A DYNAMICALLY CHANGING VIRTUAL SERVER FARM WITHOUT INVOLVEMENT OF A SERVER THAT USES AN ASSOCIATED STORAGE DEVICE

CROSS-REFERENCE TO RELATED APPLICATIONS

Continuation-in-part of application Ser. No. 09/502,170, filed Feb. 11, 2000, entitled "Extensible Computing System," naming Ashar Aziz et al. as inventors, from which domestic priority is claimed under 35 U.S.C. §120. This application is related to application Ser. No. 09/630,440, filed Sep. 20, 2000, Method And Apparatus for Controlling an Extensible Computing System, of Ashar Aziz et al now U.S. Pat. No. 6,597,956 issued Jul. 22, 2003.

FIELD OF THE INVENTION

The present invention generally relates to data processing in the field of networking. The invention relates more specifically to an approach for backup and restore of a data storage device that is carried out without involvement of a server that uses the data storage device.

BACKGROUND OF THE INVENTION

Computer data storage devices are widely used to store valuable data that is expensive to compile and essential to have on-line for the operation of business processes. However, because data storage devices can fail, periodic data backup is an essential operation to ensure that data can be recovered from a backup storage device in the event of failure of a primary storage device.

In one past approach to conventional data backup, a server that uses the storage device for data storage periodically executes a backup service or program. The server implements a file system to organize data on the storage device. The backup service queries the file system of the server to determine what files are located on the storage device, and copies the files to a backup data storage device. In one related approach, the backup service executes on a second host that queries the file system of the first server and copies data to a backup storage device that is managed by the second host. In yet another approach, the backup service performs a track-by-track backup of the data storage device, without querying the file system. However, these approaches require the backup service to know what file system or format is used to record information on the data storage device, which typically requires knowledge of the operating system that was used to control the recording of data on the data storage device. In a third approach, the server that contains the file system performs the backup itself. A fourth approach uses an agent on the server to transport the data to the backup server.

Although these past approaches are workable in some contexts, in other contexts they are impractical. One specific context in which these past approaches are inadequate is the instant data center or extensible computer system. Instant data centers are constructed using methods and systems that provide a flexible, extensible way to rapidly create and deploy complex computer systems and data centers that include a plurality of servers, one or more load balancers, firewalls, and other network elements. One method for creating such a system is described in co-pending application Ser. No. 09/502,170, filed Feb. 11, 2000, entitled "Extensible Computing System," naming Ashar Aziz et al. as inventors, the entire disclosure of which is hereby incorporated by reference as if fully set forth herein (referred to herein as "Extensible Computing System Description").

The Extensible Computing System Description discloses a method and apparatus for selecting, from within a large, extensible computing framework, elements for configuring a particular computer system. Accordingly, upon demand, a virtual server farm or other data center may be created, configured and brought on-line to carry out useful work, all over a global computer network, virtually instantaneously.

A characteristic of the approach for instantiating, using, and releasing virtual server farms disclosed in the Extensible Computing System Description is that a particular storage device may be used, at one particular time, with a first operating system or file system, and later used with a completely different second operating system and a file system. Thus, a backup service that provides backup for a particular storage device cannot assume that any particular operating system, file system, file format or recording format is then currently in use at the time of a backup. Moreover, in the context of an instant data center, one storage device may potentially be used to successively store private, confidential data of two unrelated enterprises. As a result, the backup service cannot assume that a particular storage device is storing any particular kind of data.

Based on the foregoing, there is a clear need in this field for a backup approach that does not require knowledge of the contents of the storage device, the kind of data that is stored, the file system that has been used to record data on the storage device, or the operating system that was used to control the storage device.

Another characteristic of the instant data center approach is that the servers in the data center that use the data storage devices needing backup typically have no regularly scheduled downtime, or period of known inactivity or reduced activity, in which a backup service can properly query the server or its file system.

Still another characteristic is that a storage device may be associated with different kinds of servers from time to time. For example, a particular data storage device could be associated with a set of UNIX servers over a first period of time, and then be reallocated and assigned to a set of Windows 2000 servers at a second period of time. There is a need for a backup approach that is compatible with storage devices that are re-assigned in this manner. Further, the overall configuration or topology of a particular instant data center may change from time to time in terms of number of servers, number of storage devices, and their arrangement.

Thus, there is a need for a data backup approach that does not require use of a server associated with a storage device in order to carry out backup. More specifically, there is a need for a data backup approach that is transparent or invisible from the perspective of the server that is using the data storage device that is backed up. However, there is still a need to provide notification to the server that it is about to be backed up.

Still another characteristic of the instant data center is that a fabric of network switching devices, such as VLAN switches and SAN switches, are used to logically and physically interconnect various servers and storage devices into instant data centers. Routing network traffic associated with data backup through the switching fabric may overburden the switching fabric. Thus, there is a need for a backup approach that is carried out without communicating data that is backed up through the switching fabric.

A data restoration approach that addresses the foregoing problems is also needed. In particular, there is a need for a way to carry out data restore operations without knowledge of the structure or content of the data that is restored and without knowledge of the nature, structure or organization of the storage device that is a target of data restoration.

SUMMARY OF THE INVENTION

The foregoing needs, and other needs that will become apparent from the following description, are achieved by the present invention, which comprises, in one aspect, a method of storing a backup copy of computer data. One or more datasets of a computer data storage device that participates in a dynamically changing virtual server farm are backed up without involving or affecting operation of servers in the virtual server farm that use the data storage device, and without receiving information about the structure or content of data in the datasets, the topology of the virtual server farm, or the type of server, file system, or operating system in use by the servers. A restore operation provides restored data on an address that is linearly related to and separated from a backup address. Data can be restored to a storage device without interfering with operation of the servers that use the data and without regard to structure or content of the data. Data can be backed up and restored in tracks, volumes, or other physical or logical units.

In one specific embodiment, a method of storing a backup copy of computer data involves first receiving a request to back up data associated with a dynamically changing networked computer system that comprises a data storage device and one or more servers. The computer system managing the server is told to quiesce (that is, make no more changes). It returns the current configuration to the backup system. Each server in the computer system in that configuration is requested to quiesce. A backup of the one or more tracks of the data storage device is then initiated, without involvement of the servers in the computer system that use the data storage device and without regard to structure or content of data on the tracks.

In another aspect, a method of restoring data is provided. A request to restore data associated with a host in the virtual server farm is received. The request identifies the host and a first address. Data associated with the host in a backup mass storage device is located. The data associated with the host is made available from the mass storage device at a second address that is linearly related to the first address. In one feature, the second address is determined by the relation: ((total address space of storage system)/2)+1. In another feature, in the context of SCSI storage systems, the first address is a first SCSI address, and wherein the second address is a second SCSI address having a value equal to a sum of the first SCSI address and the integer value 8.

Other aspects encompass an apparatus and a computer-readable medium that are configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A, FIG. 4B and FIG. 4C are flow diagrams of a process of operating a backup system.

DETAILED DESCRIPTION OF THE PREFERRED EMBODIMENT

An approach for backup and restore of a data storage device without involvement of a server that uses the storage device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In this document, the terms "virtual server farm," "VSF," "instant data center," and "IDC" are used interchangeably to refer to a networked computer system that comprises the combination of more than one processor, one or more storage devices, and one or more protective elements or management elements such as a firewall or load balancer, and that is created on demand from a large logical grid of generic computing elements and storage elements of the type described in the Extensible Computing System Description.

Further, for convenience, certain embodiments are described herein with reference to disk storage devices and tape backup devices. However, in each instance in which a disk storage device or tape backup device is mentioned, any other kind of computer data mass storage device may be substituted. The principles of the invention are broadly applicable to any such mass storage device.

Backup Approach

In general, in one approach, data on a computer data storage device that participates in a dynamically changing virtual server farm is backed up without involving or affecting operation of servers in the virtual server farm that use the data storage device, and without receiving information about the structure or content of the data, the topology of the virtual server farm, or the type of server, file system, or operating system in use by the servers. The approaches may be used with backup of tracks, volumes, or other logical or physical units of storage.

Figure 1:
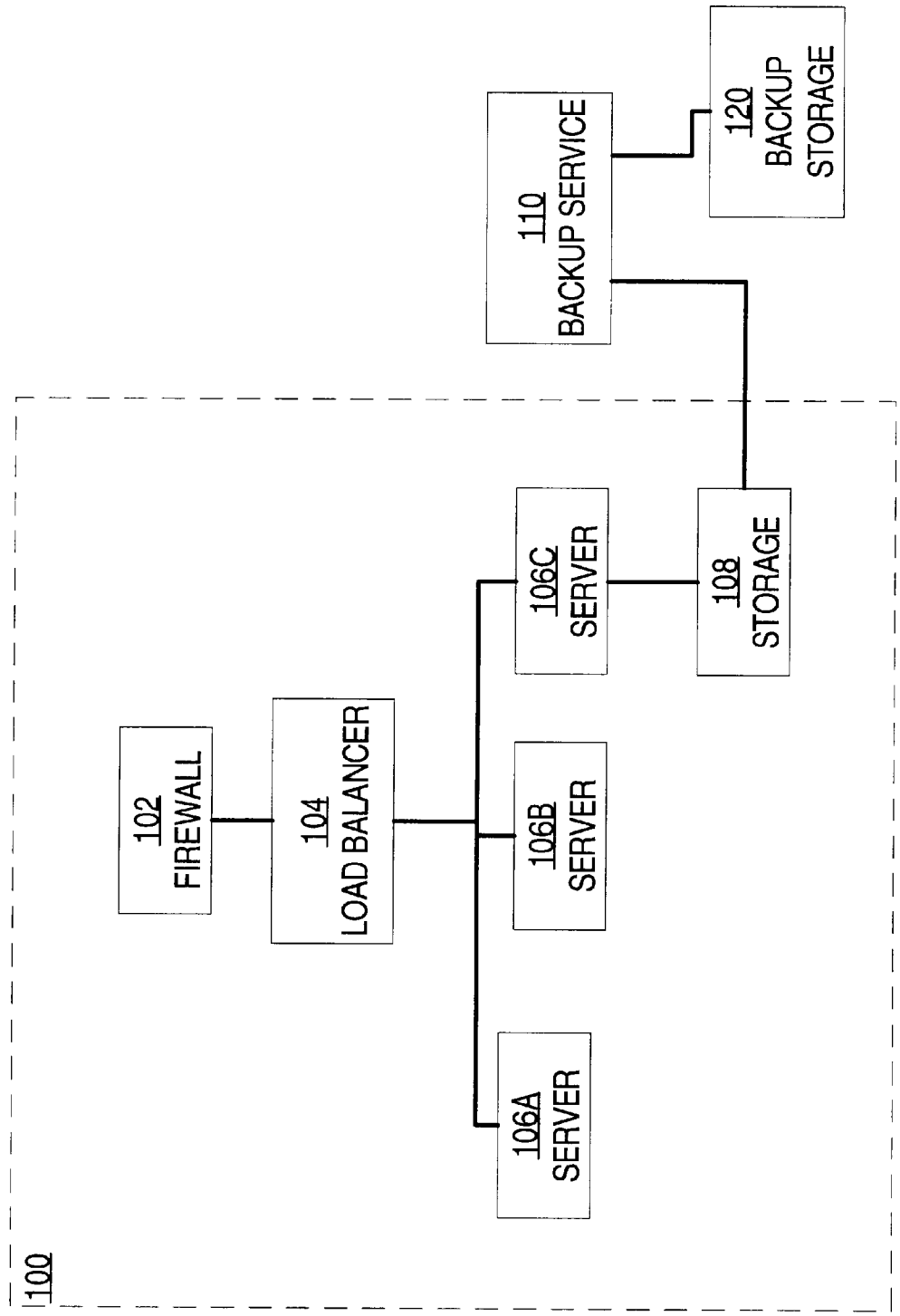
FIG. 1 is a block diagram showing a high-level view of an example instant data center and a backup service.

FIG. 1 is a block diagram showing a high-level view of an example instant data center and a backup service.

Instant data center 100 comprises a firewall 102, load balancer 104, and one or more servers 106A, 106B, 106C, etc. Each server may have an associated storage device 108, as illustrated in FIG. 1 in the case of server 106C. In this context, the term "storage device" refers to storage that may comprise one or more logical units or volumes on one or more physical storage devices. An approach for managing storage in this manner is described in co-pending application Ser. No. 09/885,290, filed Jun. 19, 2001, entitled Virtual Storage Layer Approach For Dynamically Associating Computer Storage With Processing Hosts, of Thomas Markson et al.

The firewall 102, load balancer 104, and servers 106A, 106B, 106C, etc., are logically and physically connected from time to time through a VLAN switching fabric and a SAN switching fabric under control of a control plane machine and a grid segment manager, as described in the Extensible Computing System Description. Backup service 110 is communicatively coupled to storage device 108, either directly or indirectly through a switching fabric or storage network. In this arrangement, backup service 110 can back up data from storage device 108 to backup storage device 120.

For purposes of illustrating a simple example, FIG. 1 shows an instant data center 100 that comprises three servers and one storage device. In a practical embodiment, however, an instant data center may have any number of servers and storage devices that are selectively coupled using the grid segment manager and control plane machine.

Figure 3A:
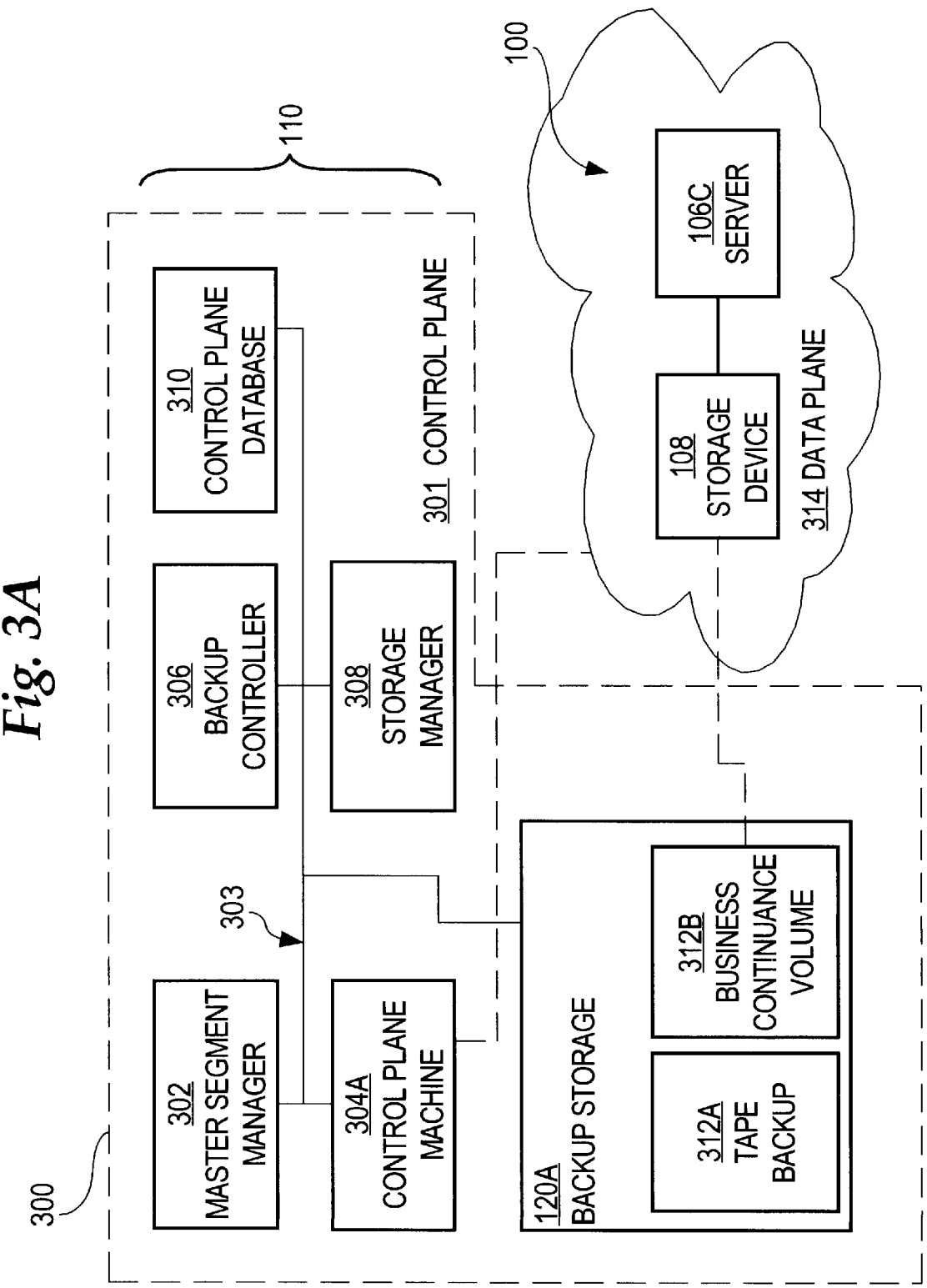
FIG. 3A is a block diagram of a backup system that may be used in one embodiment.

FIG. 3A is a block diagram of a backup system that may be used in one embodiment. In general, a backup system 300 comprises a master segment manager 302, one or more control plane machines 304A, a backup controller 306, a storage manager 308, a control plane database 310, and a backup storage system 120A. Each such element is communicatively coupled to a network 303, such as a LAN or VLAN switching fabric, using physical connections that are omitted for clarity. The elements of FIG. 3A are also illustrated without representing associated clusters, also to improve clarity.

In one specific embodiment, master segment manager 302, one or more control plane machines 304A, a backup controller 306, a storage manager 308, a control plane database 310, and a backup storage system 120A of system 300 all are located in a control plane 301 of an extensible computing system grid segment of the type described in the Extensible Computing System Description, and are used to carry out a backup of a storage device 108 that is associated with one or more servers 106C in a data plane 314. Thus, in the example of FIG. 3A, storage device 108 and server 106C represent elements of a virtual server farm 100. In one embodiment, the virtual server farm 100 is associated with a first party distinct from a second party that owns or operates the elements of system 300, and the structure and content of data on storage device 108 is known to the first party but unknown to the second party and to the elements of system 300.

Familiarity with the Extensible Computing System Description is assumed and therefore a high-level description is provided herein of those elements of FIG. 3A that are described in the Extensible Computing System Description. Master segment manager 302 controls segments of a computing grid that may be logically sub-divided into one or more instant data centers, in the manner described in the Extensible Computing System Description. Control plane machines 304A act on instructions to instantiate and terminate operation of instant data centers by selectively switching connections of servers, load balancers, firewalls, and storage. Control plane database 310 stores information identifying what servers, load balancers, firewalls, and storage devices are available within particular grid segments, how they are connected, who is using them, and similar information, to support the operation of the control plane machines 304A.

Backup controller 306 is a management software element that supervises the scheduling and performance of periodic backups of storage device 108, in conjunction with storage manager 308. An example of a commercial product that may be used to implement backup controller 306, in one embodiment, is Hewlett-Packard OpenView Omniback software executing on a computer running the HP-UX operating system.

Storage manager 308 controls association of data storage devices, such as storage device 108, to servers within virtual server farms and instant data centers, such as server 106C.

Backup storage system 120A may comprise a tape backup device 312A, or one or more other mass storage devices, operating under control of a computer controller or software manager. An example of a commercial product that may be used as backup storage system 120A is EMC Fastrax; in such an embodiment, storage manager 308 also includes Omniback-Fasttrax integration software. Backup storage system 120A also preferably includes a disk storage subsystem 120AB that may be used to mount mirror backup data volumes associated with data storage device 108. In one specific embodiment, disk storage subsystem 312B comprises one or more EMC business continuance volumes (BCVS) that provide automatic mirrored disk backup of data storage device 108. This enables a host disk in data storage device 108 to be snap copied to disk storage subsystem 3120B of backup storage system 120A, and then copied from that location to the tape backup device 312A in a separate operation.

Figure 3B:
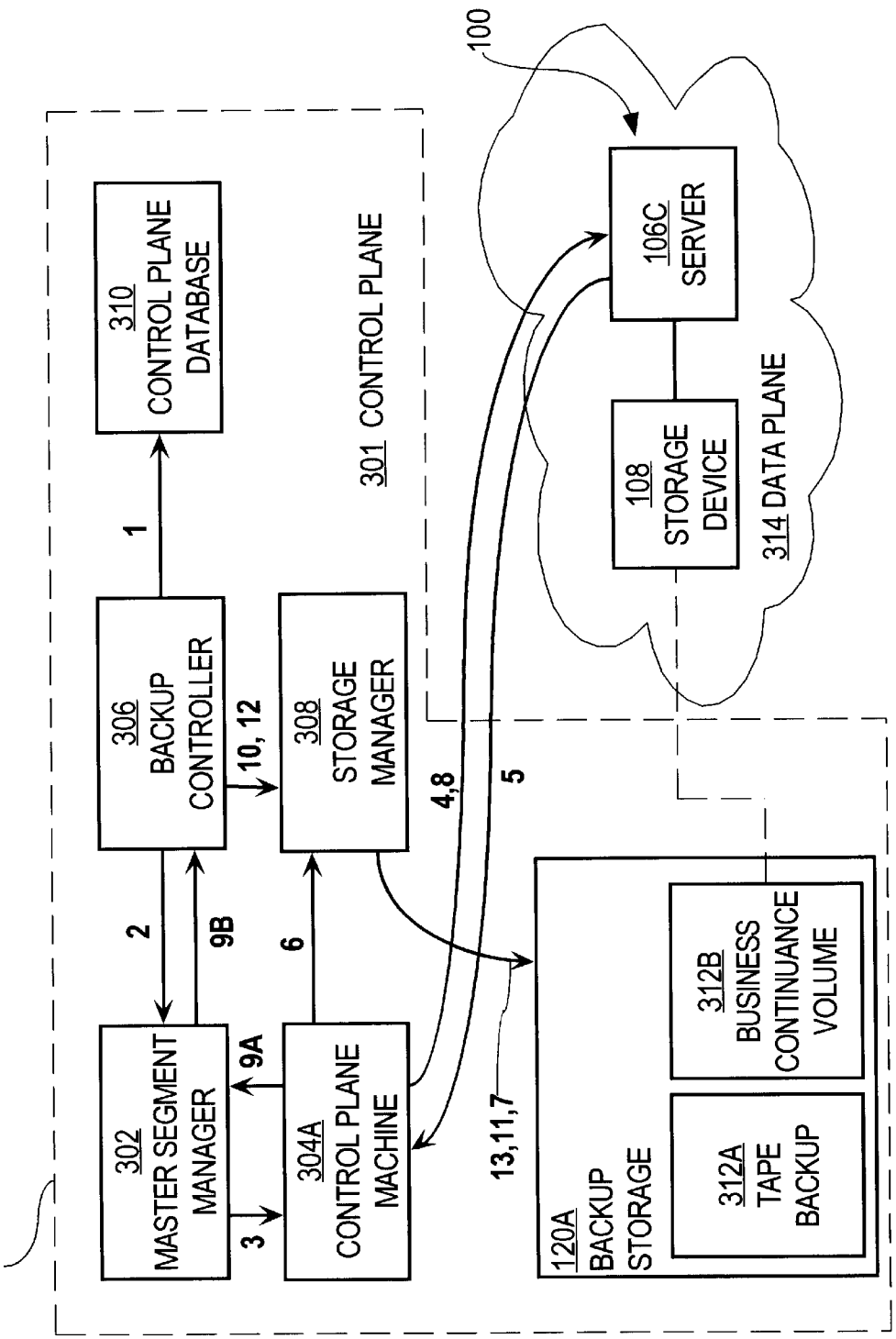
FIG. 3B is a block diagram of the backup system of FIG. 3A illustrating communication flows that occur in operation of the system, in one embodiment.
Figure 4B:
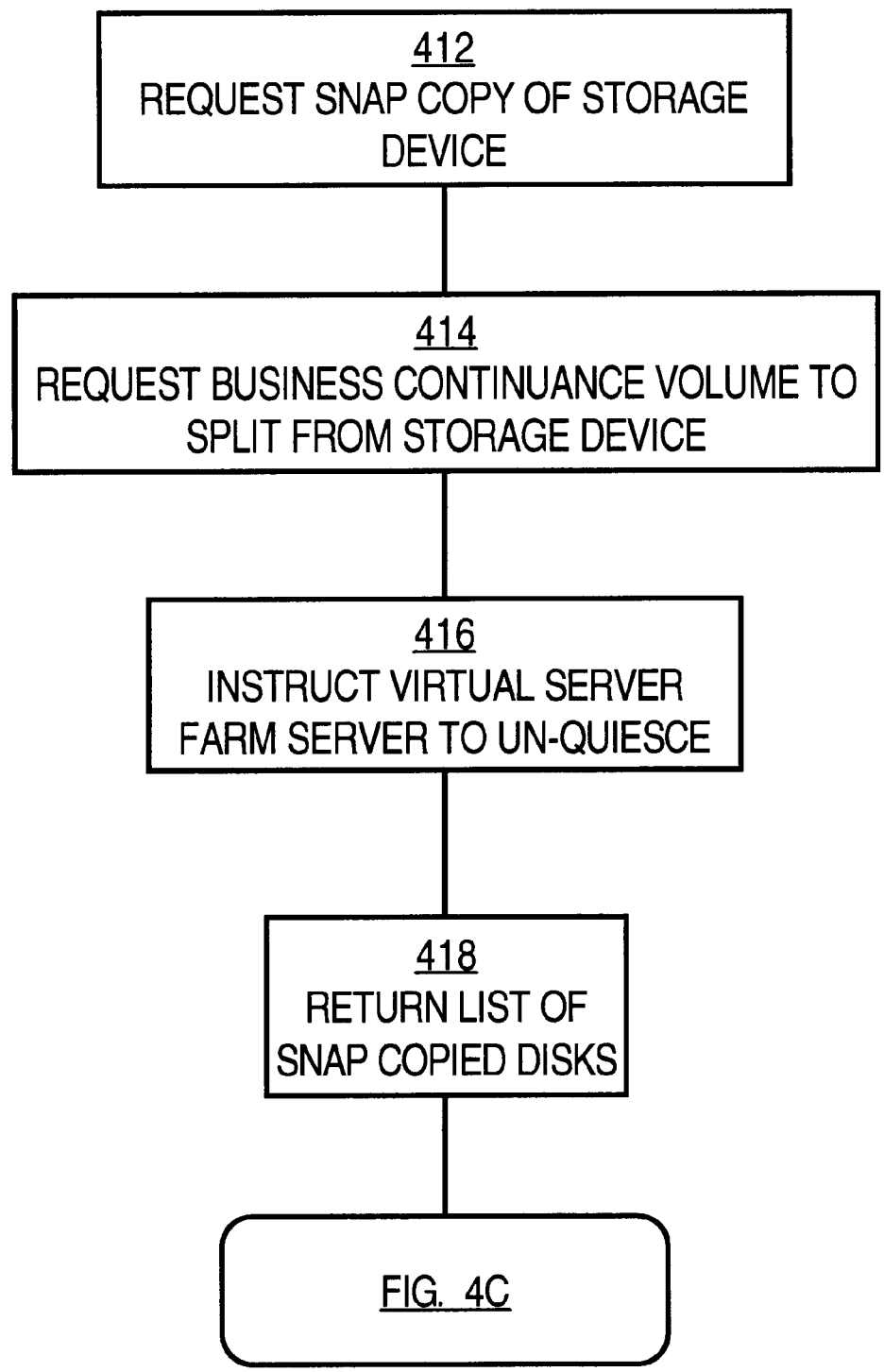

FIG. 3B is a block diagram of the backup system of FIG. 3A illustrating communication flows that occur in operation of the system, in one embodiment. FIG. 4A and FIG. 4B are flow diagrams of a process of operating a backup system, and are described herein with reference to FIG. 3B.

Referring now to FIG. 4A, in block 402, the control plane database 310 is queried to obtain a list of all virtual server farms that are then currently active in data plane 314 of a particular computing grid segment. For example, as indicated by arrow 1 of FIG. 3B, backup controller 306 issues one or more NetSQL queries to control plane database 310. In response, control plane database 310 provides a result set showing all active virtual server farms in data plane 314.

In block 406, for each of the virtual server farms that is identified in the result set, a control plane machine 304A that actually controls such virtual server farm is identified, and requested to quiesce its associated virtual server farm. For purposes of illustrating a simple example, in this description it is assumed that one virtual server farm 201 is instantiated in data plane 314 and is associated with one control plane machine 304A. In practice, however, there may be any number of virtual server farms 301 of any topology and associated control plane machines 304A. In one embodiment, as represented by arrow 3 of FIG. 3B, master segment manager places a quiesce request on a request queue that is processed by the control plane machine 304A.

In block 408, for a particular virtual server farm, each server or host therein is instructed to quiesce. In one embodiment, as indicated by arrow 4 of FIG. 3B, a control plane machine 304A that is responsible for the server farm containing server 106C and storage device 108 instructs the server 106C to quiesce. In one specific embodiment, Hewlett-Packard OpenView may be used as a transport mechanism for communicating such an instruction. Further, the VPO agent of OpenView may serve as a notification agent to inform a user host is notified that a backup has begun. As an example, the VPO agent can inform an administrative machine associated with an operator of virtual server farm 201 that a backup has begun.

In one specific embodiment, after the instruction is issued, control plane machine 304A waits for a specified timeout period, to enable server 106C to run a script to carry out quiescence. The script specifies any operations necessary to locally quiesce the virtual server farm. The specific content of the script is not critical, and is normally determined by a supervisory user of virtual server farm 201 who is familiar with what programs or data are contained on storage device 108.

Any suitable timeout period, e.g., one minute, may be used. Upon completing quiescence, server 106C returns a response message to control plane machine 304A, as indicated by block 410 of FIG. 4A and arrow 5 of FIG. 3B. Control plane machine 304A then continues processing.

Referring next to FIG. 4B, in block 412, a request to snap copy the storage device is issued. In an embodiment, a control plane machine 304A requests storage manager 308 to snap copy all storage of each host disk of storage device 108 that is associated with server 106C, as shown by arrow 6 of FIG. 3B. In this context, "snap copy" refers to copying all data in a host disk to a backup disk device, which is then used as a source device for a tape backup operation. Using snap copying, the contents of an active or online disk storage device are rapidly "frozen" so that subsequent changes in the structure or contents of the disk storage device cannot adversely affect the integrity of a tape backup operation, which typically takes far more time to carry out than a snap copy; further, the backup operation may be based on an off-line disk storage device, ensuring that the backup operation does not reduce performance of the online disk storage device.

In one embodiment, the snap copy is targeted to a business continuance volume (BCV) in storage device 312B of backup storage system 120A. In normal operation, any change to the data storage device 108 results in an incremental mirrored change to the associated BCV in storage device 312B. In block 414, a request is issued to split the BCV from the snap copy, as indicated by arrow 7 of FIG. 3B. This operation discontinues mirrored updating of the BCV and prepares the backup system to back up the BCV to a tape drive or other slower backup device. In the embodiment of FIG. 1, BCVs are stored in storage 108.

In block 416, the server is instructed to unquiesce. In one embodiment, control plane machine 304A instructs server 106C to unquiesce using an OpenView command that is sent over the path indicated by arrow 8.

In block 418, a list of the snap copied disks is returned to the backup server by the farm manager. In one embodiment, the control plane machine 304A sends a configuration of the virtual server farm in a request queue message to the master segment manager 302, as indicated by arrow 9A. The master segment manager 302 then forwards the configuration to backup controller 306, as indicated by arrow 9B.

Figure 4C:
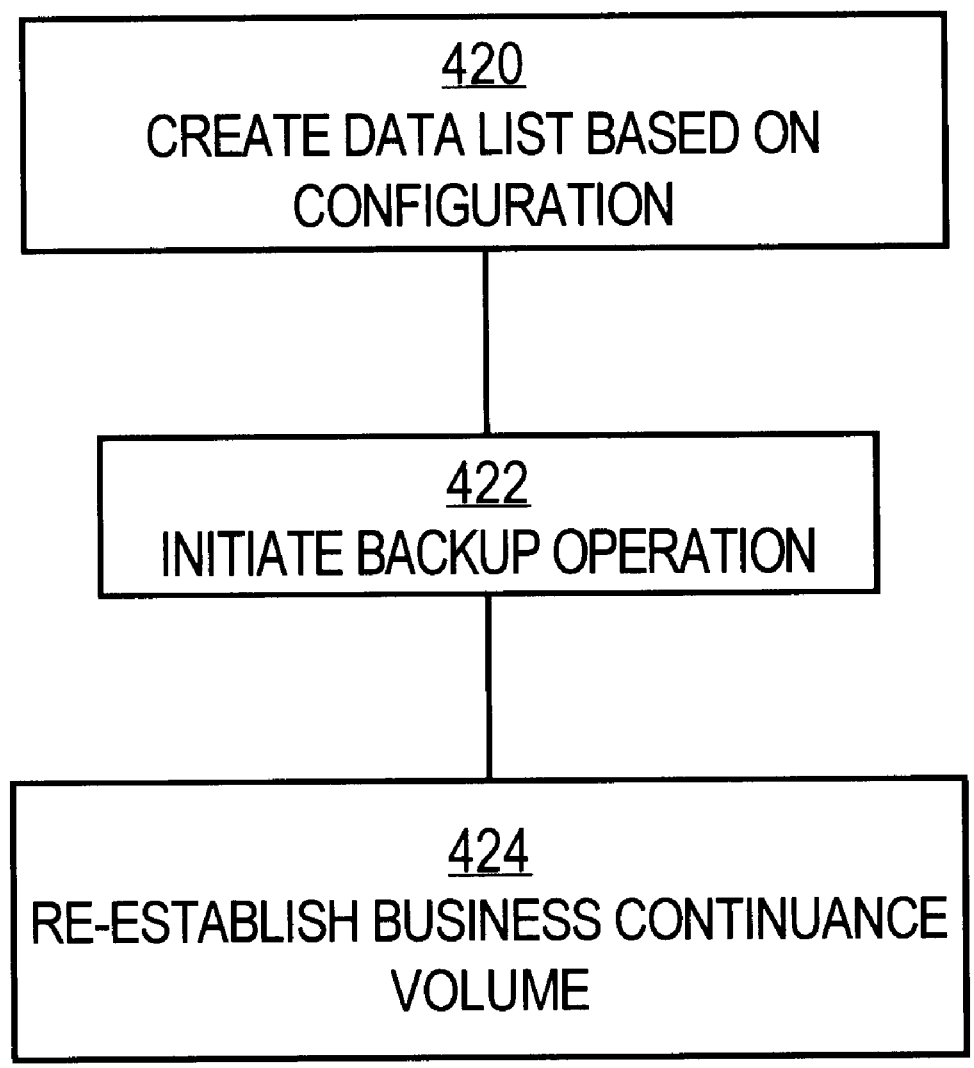

Referring now to FIG. 4C, in block 420, a data list is constructed based on the configuration information. The data list comprises a list of disks, volumes and tracks that need to be backed up in order to properly accomplish a backup of all information in storage device 108. The data list is prepared based on the farm's configuration, which may contain multiple disks. In an embodiment, backup controller 306 creates the data list from the configuration information, and then initiates a backup job based on the data list, as indicated by block 422.

The data list comprises disk volume or track information and is created without reference to the file system of server 106C. Significantly, server 106C is never queried with respect to what files to back up and the specific content of storage device 108 is not considered in carrying out the backup operation.

To carry out the backup job that is initiated in block 422, backup controller 306 requests storage controller 308 to carry out the backup, as indicated by arrow 10 of FIG. 3B. Storage manager 308 issues appropriate instructions, as represented by arrow 11, to back up storage device 120A. The back-up operation is carried out on a volume level without regard to file system organization or structure. In response, storage device copies information from the split BCV to a tape drive or other reliable storage device. In one embodiment, movement of data from disk storage devices to tape backup devices is controlled by the EMC Fastrax devices, under the supervisory control of the Omniback software.

Concurrently, backup controller 306 stores the data list in a local database maintained by it as a repository of historic backup information. The local database provides a way to determine at a future time what data was backed up in a particular backup operation.

In block 424, the business continuance volume that was split in block 414 is re-established. In one embodiment, backup controller 306 instructs storage manager 308 to reestablish the BCV, and the storage manager issues a corresponding request to backup storage system 120A, as indicated by arrows 12, 13 of FIG. 3B.

Using the foregoing server-less backup approach, a backup of a data storage device may be performed without regard to the type of server that controls the storage device, and without regarding to the file system (if any) that is used by such a server. Thus, an "opaque" backup system is provided in that the approach does not require knowledge of the content of data that is backed up; indeed, the structure and content of the data is immaterial. Backups do not pass through the primary switching fabrics of the instant data center system, keeping the switching fabrics more free of backup traffic, and thereby maintaining storage performance with negligible impact on shared switching fabrics or storage arrays. Server farm configurations may change at any time without affecting backup operation, and no significant interaction is required with a server that controls the storage device. The system backs up data tracks from the data storage device without regard for file system semantics. Because the configuration of a server farm that is subjected to backup may vary from time to time, lists of elements to back up are constructed at the time that backup initiates, "on the fly," and a database associated with the backup controller stores historical server farm configuration information.

Data Restore Approach

Data restore operations are also facilitated, according to an alternative embodiment. A restore operation provides restored data on an address that is linearly related to and separated from a backup address. Data can be restored to a storage device without interfering with operation of the servers that use the data and without regard to structure or content of the data.

In this context, "data restore" refers to copying data from a backup storage device to an online storage device, i.e., essentially the reverse of a backup operation. In an embodiment, restore operations are carried out at the volume level, rather than by restoring individual disk tracks. Restored data is provided using a novel target volume approach that enables restoration of data when the structure and content of the data to be restored are unknown, and when the structure of the target device receiving the restored data is also unknown.

Figure 2A:
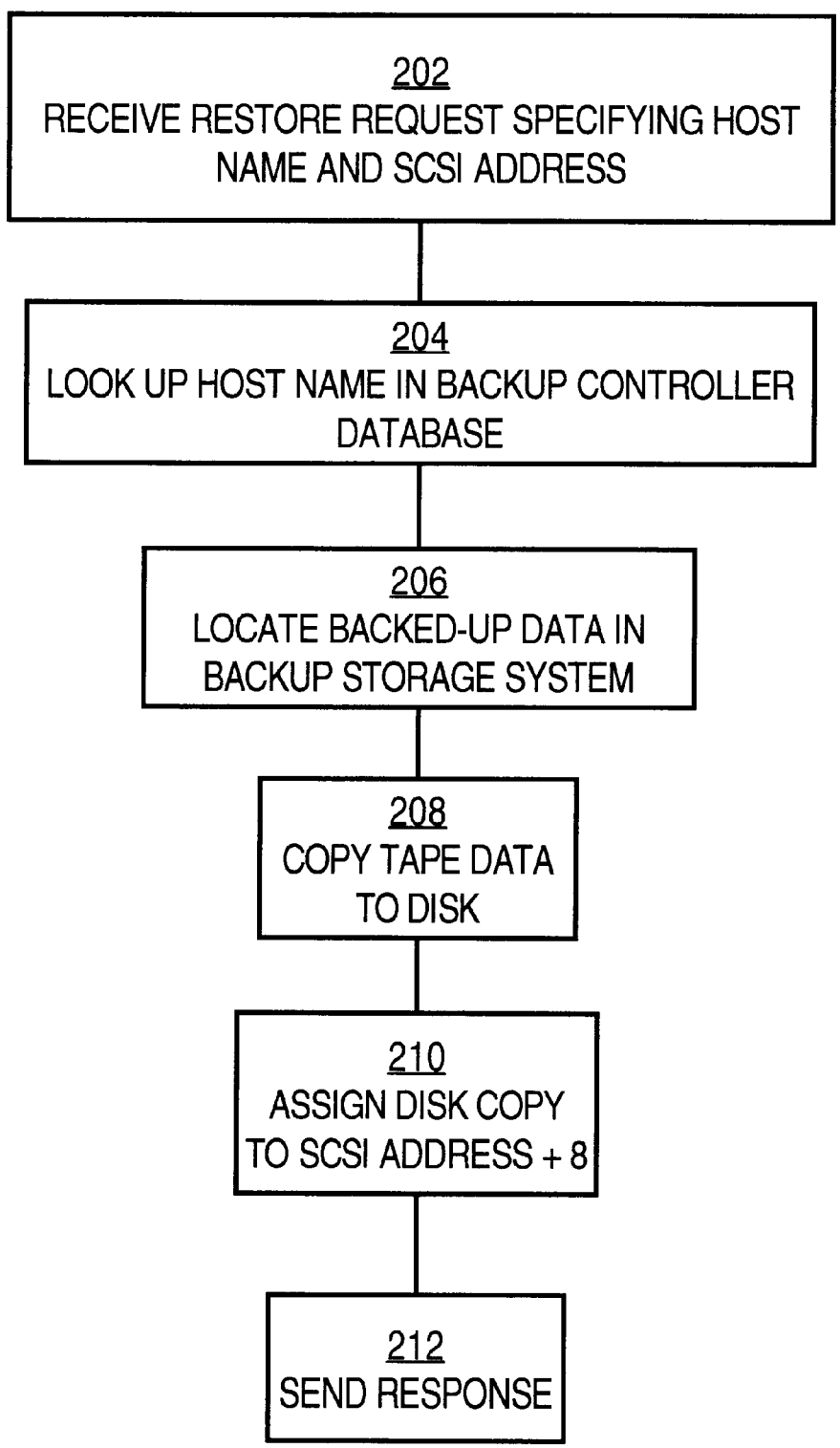
FIG. 2A is a flow diagram of a data restore approach, according to an embodiment.

FIG. 2A is a flow diagram of a data restore approach, according to an embodiment. In block 202, a data restore request is received; the request specifies a name of a host in a virtual server farm for which data should be restored, and an address of an associated data storage device. In one embodiment, the approach is used with Small Computer System Interface (SCSI) storage devices, and the address of the associated data storage device is a SCSI address of the data storage device as of the time when the data storage device was backed up. For purposes of illustrating a clear example, FIG. 2A is described below in the context of SCSI storage systems; however, the approaches herein are not limited to that context, and any suitable storage systems may be used.

In block 204, the host name is looked up in a database of historic backup information. The lookup operation is performed in order to identify a location in the backup storage system 120A that contains data that was backed up from the identified host. In one embodiment, backup controller 306 carries out the lookup in a database of historic backup information that it manages. As a result of the lookup operation, a list of restore locations is created and stored.

In block 206, previously backed up data for the named host is identified in the backup storage system, based on the information generated in the lookup operation. For example, a list of tape library locations is used to identify a tape storage device and tape location that contains backed up data for the named host. In block 208, the backed-up data is copied from the tape storage device to a mass storage device that is associated with backup storage system 120A. This mass storage device serves as an intermediate holding point for the restored data before it is moved to the host that requested it.

Figure 2B:
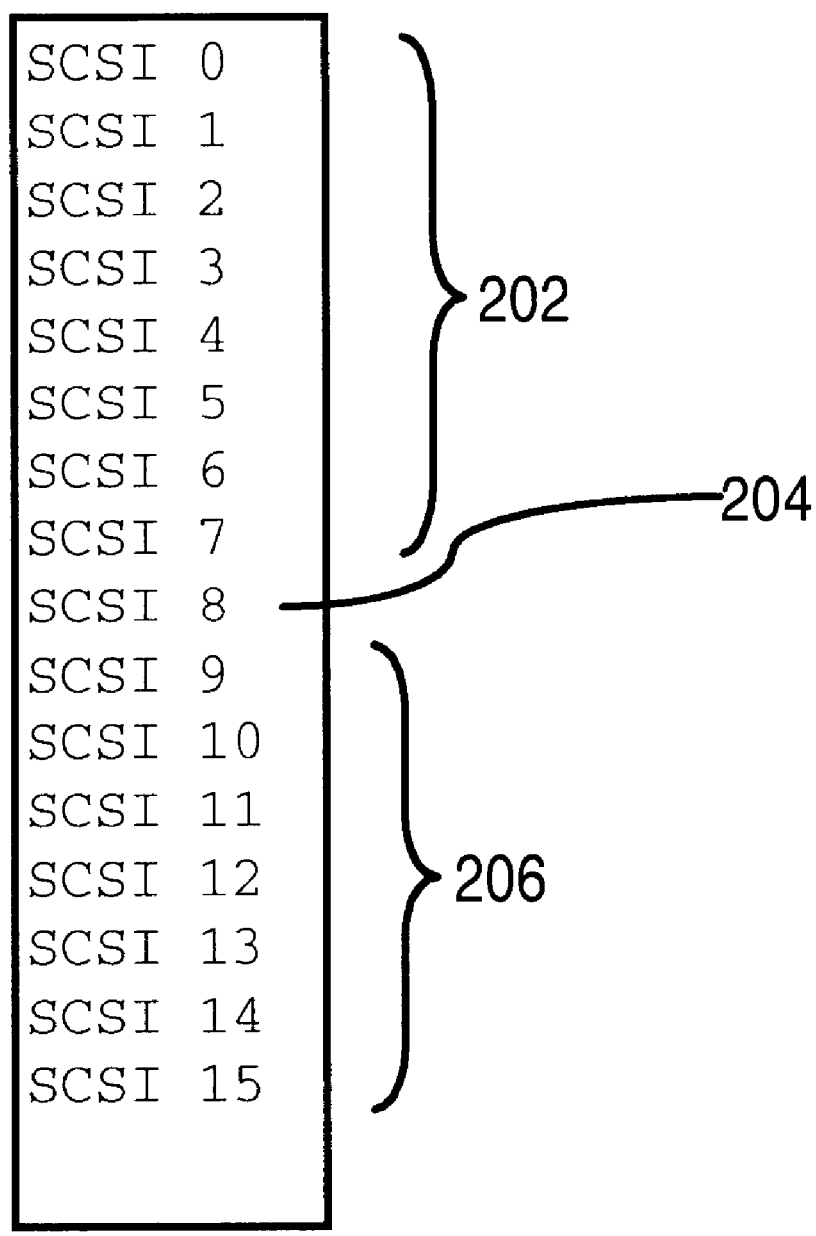
FIG. 2B is a block diagram of the SCSI address space.

In block 210, the mass storage device is assigned to an address equal to the address in the request of block 202, plus "8." In one specific embodiment, a restore approach using Small Computer System Interface (SCSI) disk devices is provided. FIG. 2B is a block diagram of the SCSI address space. In conventional practice the SCSI address space normally encompasses sixteen volume addresses designated "0" through "15". In the approach herein, a restored data volume is provided at the SCSI volume address given by the expression original target_volume_address+8

Thus, in this approach, SCSI volume addresses "0" to "7" are available for user use, as indicated by address range 202 of FIG. 2B. Volume address "8" is reserved, as indicated by address range 204 of FIG. 2B, and normally designates the address of a SCSI interface card that controls the mass storage devices. Restored data is provided as one or more of volumes "9" to "15," as indicated by address range 206. For example, if a user associated with server 106C requests restoration of SCSI volume 5 of storage device 108, the restored data is delivered on SCSI volume address 13.

Embodiments are not limited to use with SCSI storage devices, and may be used with any storage system. With other storage systems, restored data may be provided at an address given by the relation: ((total address space of storage system)/2)+1.

In block 212, a response message is sent to the requesting host, and the response message includes the address of the mass storage device that holds the restored data. The user can then re-probe the SCSI bus associated with server 106C to discover the restored data.

Hardware Overview

Figure 5:
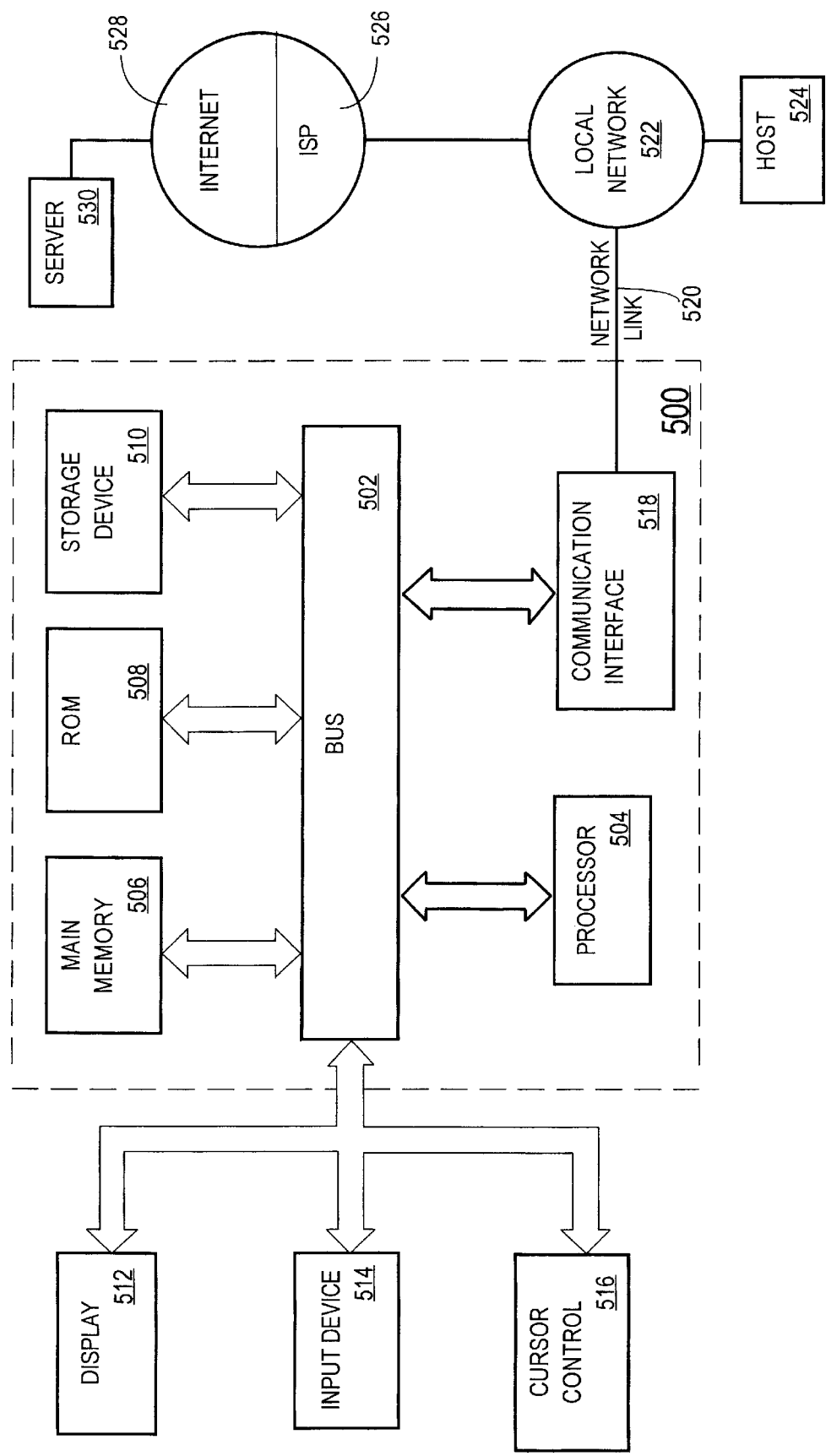
FIG. 5 is a block diagram of a computer system that may be used to implement an embodiment.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device may have two degrees of freedom in a first axis (e.g., x) and a second axis (e.g., y), which allows the device to specify positions in a plane.

The invention is related to the use of computer system 500 for backup of a data storage device that is carried out without involvement of a server that uses the data storage device. According to one embodiment of the invention, backup of a data storage device that is carried out without involvement of a server that uses the data storage device is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may be stored on storage device 510.

Computer system 500 also includes a communication interface 518 coupled to bus 502. Communication interface 518 provides a two-way data communication coupling to a network link 520 that is connected to a local network 522. For example, communication interface 518 is an ISDN card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518 are example forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for backup of a data storage device that is carried out without involvement of a server that uses the data storage device as described herein. Processor 504 may execute received code as it is received, or stored in storage device 510, or other non-volatile storage for later execution. In this manner, computer system 500 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of storing a backup copy of computer data, comprising the computer-implemented steps of:
   receiving a request to back up data associated with a networked computer system that comprises a data storage device and one or more servers, wherein the networked computer system is dynamically configured with more or fewer data storage devices and servers from time to time;
   requesting each server in the computer system to quiesce;
   receiving information defining a then-current configuration of the dynamically changing computer system;
   determining a list of datasets of the data storage device for backup;
   initiating a backup of the one or more datasets of the data storage device without involvement of the servers in the computer system that use the data storage device and without regard to structure or content of data of the datasets.

2. A method as recited in claim 1, further comprising the steps of:
   receiving a server farm list of then-active virtual server farms from a control database that stores information about a plurality of virtual server farms;
   for each virtual server farm in the server farm list
      requesting such virtual server farm to quiesce;
      identifying a control plane machine that is responsible for such virtual server farm;
      requesting such control plane machine to quiesce; and
      initiating the backup only upon receiving a response indicating quiescence.

3. A method as recited in claim 1, further comprising the steps of:
   for each virtual server farm in the server farm list
      requesting such virtual server farm to quiesce;
      requesting a snap copy of the storage device; and
      generating the information defining a then-current configuration of the dynamically changing computer system in response to completing the snap copy of the storage device.

4. A method as recited in claim 1, further comprising the steps of:
   receiving a request to restore data associated with a host in the virtual server farm, wherein the request identifies the host and a first address;
   locating the data associated with the host in a backup mass storage device; and
   making the data associated with the host available from the backup mass storage device at a second address that is linearly related to the first address.

5. A method as recited in claim 4, wherein the first address is a storage system address, and wherein the second address is a second storage system address that is determined by the relation: ((total address space of storage system)/2)+1.

6. A method as recited in claim 4, wherein the first address is a first SCSI address, and wherein the second address is a second SCSI address having a value equal to a sum of the first SCSI address and 8.

7. A computer-readable medium carrying one or more sequences of instructions for storing a backup copy of computer data, wherein execution of the one or more sequences of instructions by one or more processors causes the one or more processors to perform the steps of:
   receiving a request to back up data associated with a networked computer system that comprises a data storage device and one or more servers, wherein the networked computer system is dynamically configured with more or fewer data storage devices and servers from time to time;

requesting each server in the computer system to quiesce;

receiving information defining a then-current configuration of the dynamically changing computer system;

determining a list of one or more volumes or tracks of the data storage device for backup;

initiating a backup of the one or more volumes or tracks of the data storage device without involvement of the servers in the computer system that use the data storage device and without regard to structure or content of data on the storage.

8. A computer-readable medium as recited in claim 7, further comprising sequences of instructions which, when executed by the one or more processors, cause the one or more processors to carry out the steps of:

receiving a server farm list of then-active virtual server farms from a control database that stores information about a plurality of virtual server farms;

for each virtual server farm in the server farm list
requesting such virtual server farm to quiesce;
identifying a control plane machine that is responsible for such virtual server farm;
requesting such control plane machine to quiesce; and
initiating the backup only upon receiving a response indicating quiescence or timeout.

9. A computer-readable medium as recited in claim 7, further comprising sequences of instructions which, when executed by the one or more processors, cause the one or more processors to carry out the steps of:

for each virtual server farm in the server farm list
requesting such virtual server farm to quiesce;
requesting a snap copy of the storage device; and
generating the information defining a then-current configuration of the dynamically changing computer system in response to completing the snap copy of the storage device.

10. A computer-readable medium as recited in claim 7, further comprising sequences of instructions which, when executed by the one or more processors, cause the one or more processors to carry out the steps of:

receiving a request to restore data associated with a host in the virtual server farm, wherein the request identifies the host and a first address;

locating the data associated with the host in a backup mass storage device; and making the data associated with the host available from the backup mass storage device at a second address that is linearly related to the first address.

11. A computer-readable medium as recited in claim 10, wherein the first address is a storage system address, and wherein the second address is a second storage system address that is determined by the relation: ((total address space of storage system)/2)+1.

12. A computer-readable medium as recited in claim 10, wherein the first address is a first SCSI address, and wherein the second address is a second SCSI address having a value equal to a sum of the first SCSI address and 8.

13. A method of restoring data associated with a host in a virtual server farm, comprising the steps of:

receiving a request to restore data associated with the host in the virtual server farm, wherein the request identifies the host and a first address, wherein the virtual server farm is dynamically changing;

locating the data associated with the host in a backup mass storage device; and making the data associated with the host available from the backup mass storage device at a second address that is linearly related to the first address.

14. A method as recited in claim 13, wherein the first address is a storage system address, and wherein the second address is a second storage system address that is determined by the relation: ((total address space of storage system)/2)+1.

15. A method as recited in claim 13, wherein the first address is a first SCSI address, and wherein the second address is a second SCSI address having a value equal to a sum of the first SCSI address and 8.

16. A computer-readable medium carrying one or more sequences of instructions for restoring data associated with a host in a virtual server farm, wherein execution of the one or more sequences of instructions by one or more processors causes the one or more processors to perform the steps of:

receiving a request to restore data associated with the host in the virtual server farm, wherein the request identifies the host and a first address, wherein the virtual server farm is dynamically changing;

locating the data associated with the host in a backup mass storage device; and making the data associated with the host available from the backup mass storage device at a second address that is linearly related to the first address.

17. A computer-readable medium as recited in claim 16, wherein the first address is a storage system address, and wherein the second address is a second storage system address that is determined by the relation: ((total address space of storage system)/2)+1.

18. A computer-readable medium as recited in claim 16, wherein the first address is a first SCSI address, and wherein the second address is a second SCSI address having a value equal to a sum of the first SCSI address and 8.

19. An apparatus for storing a backup copy of computer data, comprising:

means for receiving a request to back up data associated with a dynamically changing networked computer system that comprises a data storage device and one or more servers;

means for requesting each server in the computer system to quiesce;

means for receiving information defining a then-current configuration of the dynamically changing computer system;

means for determining a list of one or more tracks of the data storage device for backup;

means for initiating a backup of the one or more tracks of the data storage device without involvement of the servers in the computer system that use the data storage device and without regard to structure or content of data on the tracks.

20. Apparatus as recited in claim 19, further comprising:

means for receiving a server farm list of then-active virtual server farms from a control database that stores information about a plurality of virtual server farms;

means, for each virtual server farm in the server farm list, for
requesting such virtual server farm to quiesce;
identifying a control plane machine that is responsible for such virtual server farm;
requesting such control plane machine to quiesce; and initiating the backup only upon receiving a response indicating quiescence.

21. Apparatus as recited in claim 19, further comprising:

means, for each virtual server farm in the server farm list, for
  requesting such virtual server farm to quiesce;
  requesting a snap copy of the storage device; and
  generating the information defining a then-current configuration of the dynamically changing computer system in response to completing the snap copy of the storage device.

22. Apparatus as recited in claim 19, further comprising:

means for receiving a request to restore data associated with a host in the virtual server farm, wherein the request identifies the host and a first address;
means for locating the data associated with the host in a backup mass storage device; and
means for making the data associated with the host available from the backup mass storage device at a second address that is linearly related to the first address.

23. Apparatus as recited in claim 22, wherein the first address is a first SCSI address, and wherein the second address is a second SCSI address having a value equal to a sum of the first SCSI address and 8.

24. An apparatus for storing a backup copy of computer data, comprising:

a control plane that manages one or more computing grid segments each comprising one or more virtual server farms, each virtual server farm comprising a dynamically changing networked computer system that comprises a data storage device and one or more servers;
a backup controller that is communicatively coupled to the control plane, and comprising sequences of instructions which, when executed by one or more processors, cause the one or more processors to carry out the steps of:
  receiving a request to back up data associated with one of the virtual server farms;
  identifying each server in the virtual server farm, based on a control database of virtual server farm information that is communicatively coupled to the backup controller;
  requesting each server in the virtual server farm identified in the request to quiesce;
  receiving information defining a then-current configuration of the virtual server farm from the control plane;
  determining a list of one or more tracks of the data storage device for backup;
  initiating a backup of the one or more tracks of the data storage device to a backup storage system that is communicatively coupled to the backup controller, without involvement of the servers in the virtual server farm that use the data storage device and without regard to structure or content of data on the tracks.

25. An apparatus as recited in claim 24, further comprising instructions which, when executed by the one or more processors, cause the one or more processors to carry out the steps of:
  receiving a server farm list of then-active virtual server farms from the control database;
  for each virtual server farm in the server farm list
    requesting such virtual server farm to quiesce;
    identifying a control plane machine in the control plane that is responsible for managing such virtual server farm;
    requesting such control plane machine to quiesce; and
    initiating the backup only upon receiving a response indicating quiescence.

26. An apparatus as recited in claim 24, further comprising instructions which, when executed by the one or more processors, cause the one or more processors to carry out the steps of:
  for each virtual server farm in the server farm list
    requesting such virtual server farm to quiesce;
    requesting a snap copy of the storage device; and
    generating the information defining a then-current configuration of the virtual server farm in response to completing the snap copy of the storage device.

27. An apparatus as recited in claim 24, further comprising instructions which, when executed by the one or more processors, cause the one or more processors to carry out the steps of:
  receiving a request to restore data associated with a host in the virtual server farm, wherein the request identifies the host and a first address;
  locating the data associated with the host in a backup mass storage device; and
  making the data associated with the host available from the mass storage device at a second address that is linearly related to the first address.

28. An apparatus as recited in claim 27, wherein the first address is a storage system address, and wherein the second address is a second storage system address that is determined by the relation: ((total address space of storage system)/2)+1.

29. An apparatus as recited in claim 27, wherein the first address is a first SCSI address, and wherein the second address is a second SCSI address having a value equal to a sum of the fist SCSI address and 8.

* * * * *

UNITED STATES PATENT AND TRADEMARK OFFICE
CERTIFICATE OF CORRECTION

PATENT NO. : 6,714,980 B1
DATED : March 30, 2004
INVENTOR(S) : Thomas Markson et al.

It is certified that error appears in the above-identified patent and that said Letters Patent is hereby corrected as shown below:

Column 16,
Line 51, replace "fist" with -- first --.

Signed and Sealed this

Twentieth Day of July, 2004

JON W. DUDAS
*Acting Director of the United States Patent and Trademark Office*